(12) United States Patent
Yasuda et al.

(10) Patent No.: US 11,787,001 B2
(45) Date of Patent: Oct. 17, 2023

(54) SPINDLE DEVICE FOR MACHINE TOOL

(71) Applicant: MAKINO MILLING MACHINE CO., LTD., Tokyo (JP)

(72) Inventors: Yosuke Yasuda, Kanagawa (JP); Takeshi Kawada, Kanagawa (JP); Kazumasa Kono, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 637 days.

(21) Appl. No.: 16/982,194

(22) PCT Filed: Mar. 20, 2019

(86) PCT No.: PCT/JP2019/011837
§ 371 (c)(1),
(2) Date: Sep. 18, 2020

(87) PCT Pub. No.: WO2019/182048
PCT Pub. Date: Sep. 26, 2019

(65) Prior Publication Data
US 2021/0023670 A1 Jan. 28, 2021

(30) Foreign Application Priority Data

Mar. 20, 2018 (JP) .................. 2018-053287

(51) Int. Cl.
*B23Q 11/12* (2006.01)
*B23Q 1/70* (2006.01)
*B23Q 5/10* (2006.01)

(52) U.S. Cl.
CPC ............... *B23Q 5/10* (2013.01); *B23Q 1/70* (2013.01); *B23Q 11/127* (2013.01); *Y10T 409/303976* (2015.01); *Y10T 409/309352* (2015.01)

(58) Field of Classification Search
CPC .. B23Q 11/127; B23Q 1/70; B23Q 2220/006; B23Q 11/12–11/128; B23Q 5/04–5/20;
(Continued)

(56) References Cited

U.S. PATENT DOCUMENTS 4,133,230 A * 1/1979 Inaba ................ B23Q 11/127
82/900
4,196,501 A * 4/1980 Shimajiri .............. B23B 31/263
409/233

(Continued)

FOREIGN PATENT DOCUMENTS

JP 53-135082 A 11/1978
JP 57-23946 U 2/1982
(Continued)

OTHER PUBLICATIONS

International Search Report and Written Opinion dated May 14, 2019, directed to International Patent Application No. PCT/JP2019/011837; 18 pages.

*Primary Examiner* — Erica E Cadugan
(74) *Attorney, Agent, or Firm* — MORRISON & FOERSTER LLP

(57) ABSTRACT

A spindle device of a machine tool is provided with: a rear-side bearing and front-side bearings which rotatably support a spindle with respect to a housing; a built-in motor which is disposed around the spindle between the front-side bearings and the rear-side bearing; heat pipes which are embedded in the spindle and which transmit heat between the central part and the rear-end part of the spindle; a plurality of plate-like inner fins which are affixed to a rear part of the spindle that protrudes rearward of the rear-side bearing and which extend perpendicularly with respect to the rotation axis of the spindle; and a plurality of plate-like outer fins which are affixed to the housing and which are
(Continued)

disposed between the plurality of inner fins in such a manner as not to contact the inner fins.

6 Claims, 2 Drawing Sheets

(58) Field of Classification Search
CPC .... B23Q 2705/00–08; B23Q 2210/004; Y10T 409/309352–309464; Y10T 408/94–957; Y10T 82/2552–2562; Y10T 409/303976; Y10S 82/90
USPC ............ 409/231–233, 135; 408/238–239 A; 82/142–147, 900
See application file for complete search history.

(56) References Cited

U.S. PATENT DOCUMENTS

| | | | | |
|---|---|---|---|---|
| 4,206,392 | A | | 6/1980 | Hattori |
| 4,211,454 | A | * | 7/1980 | Mitchell ............ B23Q 11/123 384/192 |
| 6,144,123 | A | * | 11/2000 | Selci .................... B23Q 11/127 409/135 |
| 8,944,731 | B2 | * | 2/2015 | Morimura ............ B23Q 11/127 409/231 |

FOREIGN PATENT DOCUMENTS

| | | | |
|---|---|---|---|
| JP | 57-101579 | U | 6/1982 |
| JP | 2-36679 | Y2 | 10/1990 |
| JP | 63-207536 | A * | 8/1998 |
| JP | 2008-288330 | A | 11/2008 |

* cited by examiner

SPINDLE DEVICE FOR MACHINE TOOL

CROSS-REFERENCE TO RELATED APPLICATIONS

This Application is a US National Stage Application under 35 USC 371 of International Patent Application No. PCT/JP2019/011837, filed on Mar. 20, 2019, which claims the priority of JP Application No. 2018-053287, filed on Mar. 20, 2018, the entire contents of each of which are incorporated herein by reference.

FIELD OF THE DISCLOSURE

The present invention relates to a spindle device for a machine tool which uses a heat pipe and a heat exchanger and which can efficiently discharge heat from a spindle formed so that a tool or workpiece can be mounted on a tip thereof.

BACKGROUND OF THE DISCLOSURE

When the spindles of machine tools such as mills or lathes rotate, heat is generated in the bearings thereof, whereby the temperature of the spindle increases, and since the spindle extends, machining precision is reduced. Conventionally, various bearing cooling methods to prevent or reduce such spindle temperature increases have been proposed. For example, Patent Literature 1 describes a spindle bearing cooling structure wherein heat pipes are embedded in a spindle so as to extend across the front bearing and rear bearing rotatably supporting the spindle of a machine tool, fins are provided on an outer peripheral surface of a central portion of the spindle between the front bearing and the rear bearing, the heat generated by the front bearing and the rear bearing is transmitted to the central portion of the spindle by the heat pipes, and the heat is radiated from the fins to the outside of the spindle.

PATENT LITERATURE

[PTL 1] Japanese Examined Utility Model Publication (Kokoku) No. 02-036679

BRIEF SUMMARY OF THE DISCLOSURE

In the spindle bearing cooling structure of Patent Literature 1, since the heat generated by the front bearing and the rear bearing is discharged within the housing of the spindle device, subsequently passes through the housing, and is discharged to the outside, the temperature of the entire spindle device including the spindle increases. Thus, the radiation of heat from the fins provided on the outer peripheral surface of the spindle is insufficient, and the effects of suppressing temperature increases of the spindle are limited. Furthermore, in the application to a built-in motor-type spindle, in which a motor is incorporated between the front bearing and the rear bearing, is used, since the rotor and stator of the motor cover the outer peripheral surface of the spindle, the discharge of heat is hindered. Furthermore, the rotor and stator of the motor themselves also become heat generation sources, increasing the temperature of the spindle.

An object of the present invention is to solve such problems of the prior art and to provide a spindle device which can efficiently discharge heat of the spindle to the outside.

In order to achieve the object above, according to the present invention, there is provide a spindle device for a machine tool which is formed so that a tool or workpiece is retained on a front end of a spindle which is supported so as to be rotatable relative to a housing, the spindle device comprising a front bearing which rotatably supports the spindle on a front side of the spindle, a rear bearing which rotatably supports the spindle more rearwardly than the front bearing, a built-in motor which is arranged on a circumference of the spindle in a central portion between the front bearing and the rear bearing for rotatably driving the spindle, a heat pipe which is embedded in the spindle and which transmits heat between a central part and a rear end of the spindle, a plurality of plate-like inner fins which are affixed to a rear portion of the spindle protruding more rearwardly than the rear bearing, which are arranged in the direction of the axis of rotation of the spindle, and which extends in a direction orthogonal to the axis of rotation of the spindle, and a plurality of plate-like outer fins which are affixed to the housing and which are arranged between the plurality of inner fins so as to not contact the inner fins.

According to the present invention, the heat transmitted from the built-in motor to the spindle passes through the heat pipe, is efficiently transmitted to the rear portion of the spindle, and can be efficiently transmitted from the rear portion of the spindle to the inner fins to the outer fins in a non-contact manner. As a result, the spindle can be effectively cooled.

DETAILED DESCRIPTION OF THE DISCLOSURE

Figure 1:
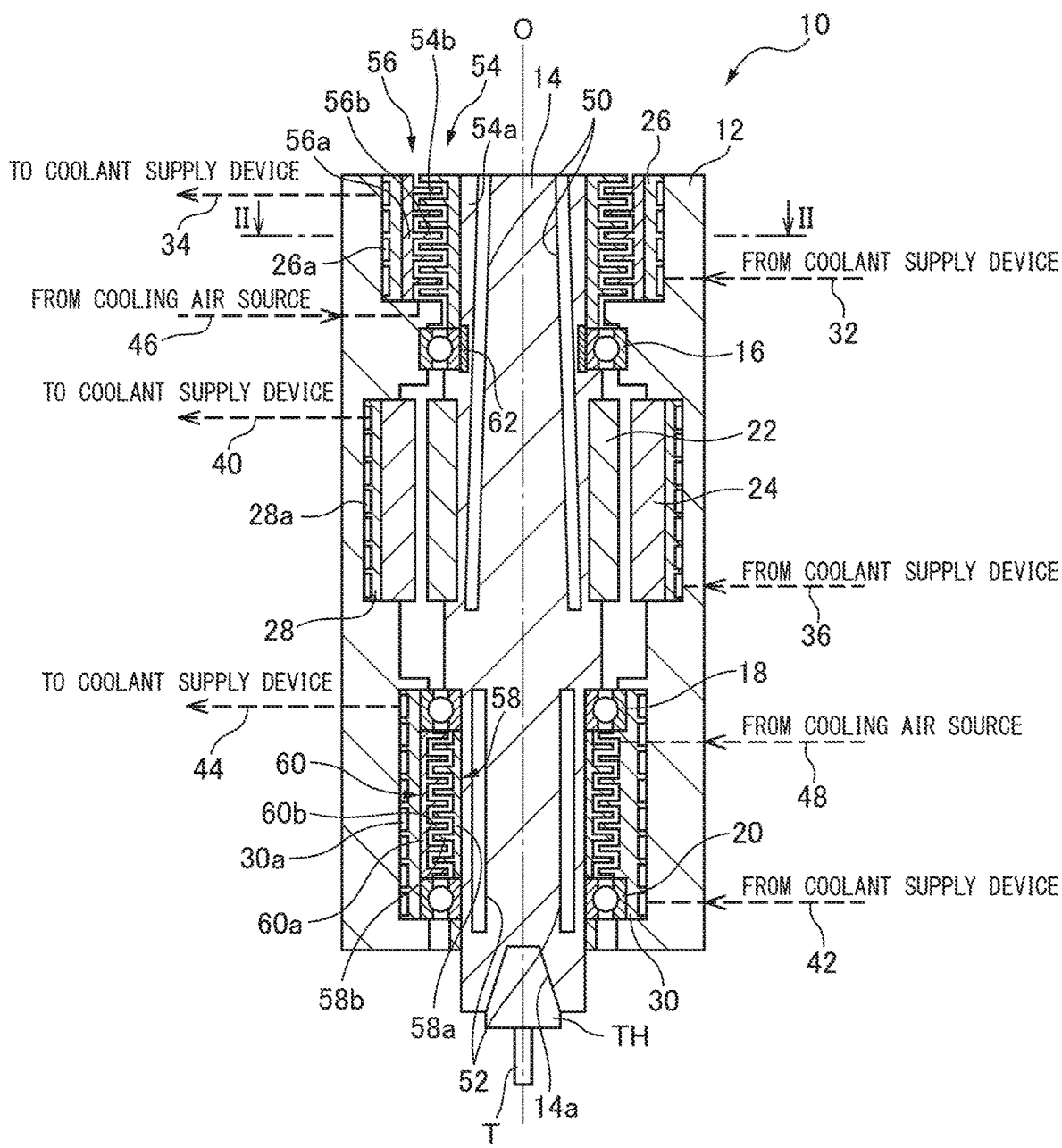
FIG. 1 is a sectional view of a spindle device according to a preferred embodiment of the present invention.

The preferred embodiments of the present invention will be described below with reference to the attached drawings.

In the preferred embodiments of the present invention described below, the spindle device is a spindle device for a machine tool in which a tool is mounted on the tip of a spindle, the tool is moved in three orthogonal X-axis, Y-axis, and Z-axis directions relative to a workpiece mounted on a table, and the workpiece is machined by the rotating tool. However, the spindle device of the present invention may be a spindle device for a machine tool in which a workpiece is mounted on the tip of a spindle, and a stationary cutting tool (bite tool) is pressed against the rotating workpiece to machine the workpiece.

A spindle device 10 comprises a hollow housing 12 and a spindle 14 which is rotatably supported in the housing 12. A tapered hole 14a for the mounting of a rotary tool T, such as an end mill, via a tool holder TH is formed in the tip of the spindle 14. The spindle 14 is supported by a rear bearing 16 and front bearings 18, 20 so as to be capable of rotating about the axis of rotation O.

In the embodiment of FIG. 1, the rear bearing supports the rear end portion of the spindle 14, and the front bearings 16, 18 support the front end portion of the spindle 14. Since a large force is exerted on the front end portion of the spindle 14 during machining, the front end portion of the spindle 14 is supported by two front bearings 16, 18. Conversely, the rear end portion of the spindle 14, which has a comparatively small load, is supported by one rear bearing 16. The arrangements and numbers of the rear bearing 16 and the front bearings 18, 20 can be selected in accordance with need. Note that in the present invention, the central portion does not mean the position where the distance from the front end and the rear end of the spindle 14 in the direction of the axis of rotation is in the center, but rather means the portion which is between the front bearings 16, 18, which support the front end, and the rear bearing, which supports the rear end.

Within the housing 12, a built-in motor for rotationally driving the spindle 14 is incorporated in the portion of the housing 12 corresponding to the central portion of the spindle 14 between the rear bearing 16 and the front bearings 18, 20. The built-in motor comprises a rotor 22 which is affixed to an outer surface of the central portion of the spindle 14, and a stator 24 which is affixed to the housing 12 so as to face the rotor 22. The built-in motor 22, 24 is connected to a control device of the machine tool, for example, an NC device (not illustrated), and the starting and stopping of rotation and the rotation speed are controlled by the NC device.

The spindle device 10 comprises a rear heat exchanger in a rear portion thereof (the upper end of the spindle device 10 in FIG. 1). The rear heat exchanger comprises inner fins 54 and outer fins 56. The inner fins 54 are affixed to the rear portion which protrudes more rearwardly than the rear bearing 16 of the spindle 14 so as to rotate along with the spindle 14. The inner fins 54 comprise a cylindrical base member 54a which is affixed to an outer peripheral surface of the spindle 14, and a plurality of fin members 54b which protrude radially outwardly from the base member 54a. Each of the fin members 54b is a plate member extending in a direction orthogonal to the axis of rotation O, and is preferably formed in a ring-like shape. Furthermore, the plurality of fin members 54b are arranged at predetermined intervals in the direction of the axis of rotation O of the spindle 14 along the outer peripheral surface of the base member 54a. The inner fins 55 can be formed by, for example, brazing or welding the ring-shaped fin members 54b to the outer surface of the base member 54a. Alternatively, the fin members 54b and the base member 54a may be integrally formed by forming a plurality of circumferential grooves in the outer peripheral surface of the cylindrical member. The inner fins 54 are preferably arranged so that the inner peripheral surface of the base member 54a thereof directly contacts the outer peripheral surface of the spindle 14.

The outer fins 56 are affixed to the rear portion of the housing 12 so as to face the inner fins 54. The outer fins 56 do not rotate along with the spindle 14. The outer fins 56 comprise a cylindrical or arcuate base member 56a and a plurality of fin members 56b which protrude radially inwardly from the inner peripheral surface of the base member 56a. Each of the fin members 56b is a plate member extending in a direction orthogonal to the axis of rotation O, and can be formed in an annular shape or an arcuate shape, which will be described later. The outer fins 56 are preferably arranged so that the outer peripheral surface of the base member 56a thereof directly contacts the inner peripheral surface of the cylindrical member 26.

The inner fins 54 and the outer fins 56 are attached to the spindle 14 and the housing 12, respectively, so that the fin members 54b, 56b are alternatingly arranged in the direction of the axis of rotation O. Though the intervals between the fin members 54b, 56b of the inner fins 54 and the outer fins 56 are preferably small, they should be selected so that the fin members 54b, 56b do not come into contact due to vibration or the like during rotation of the spindle 14.

Figure 2:
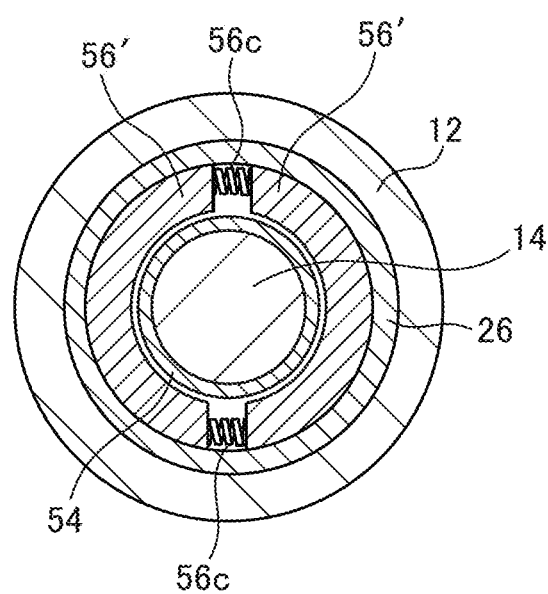
FIG. 2 is a partial cross-sectional view of the spindle device taken along line II-II of FIG. 1.

Referring to FIG. 2, which is a partial cross-sectional view of the spindle device 10 along a plane orthogonal to the axis of rotation O, the outer fins 56 of the rear heat exchanger comprise two half body portions 56'. The half body portions 56' can be formed by brazing or welding arcuate fin members 56b to the inner peripheral surface of a semi-cylindrical member or an at least partially cylindrical member. Alternatively, in the half body portions 56', the fin members 56b, and the base member 56a may be integrally formed by forming a plurality of grooves in the inner peripheral surface of a semi-cylindrical member or an at least partially arcuate member. Biasing members 56c which press the half body portions 56' against the inner surface of the housing 12, or in the present embodiment, the inner peripheral surface of the cylindrical member 26 forming a rear coolant passage 26a, are arranged between the two half body portions 56'. The biasing members 56c can be formed from coil springs or disc springs.

A front heat exchanger which is identical to the rear heat exchanger is provided on the front portion (the lower end portion in FIG. 1) of the spindle device 10. The front heat exchanger comprises inner fins 58 which are provided on the front portion of the spindle 14, and more specifically, in the portion between the two front bearings 18, 20, and outer fins 60 which are affixed to the inner surface of the housing 12 so as to face the inner fins 58.

The inner fins 58 comprise a cylindrical base member 58a which is affixed to the outer peripheral surface of the spindle 14 and a plurality of fin members 58b which protrude radially outwardly from the base member 58a. The inner fins 58 are preferably arranged so that the inner peripheral surface of the base member 58a thereof directly contacts the outer peripheral surface of the spindle 14.

The outer fins 60 comprise a cylindrical or arcuate base member 60a and a plurality of fin members 60b which protrude radially inwardly from the inner peripheral surface of the base member 60a. The outer fins 60 are preferably arranged so that the outer peripheral surface of the base member 60a thereof directly contacts the inner peripheral surface of the cylindrical member 30. The outer fins 60 can be formed from two half body portions, like the outer fins 56 of the rear heat exchanger.

The inner fins 58 and the outer fins 60 are attached to the spindle 14 and the housing 12, respectively, so that the respective fin members 58b, 60b are alternatingly arranged in the direction of the axis of rotation O. Though the intervals between the fin members 58b, 60b of the inner fins 58 and the outer fins 60 are preferably small, they should be selected so that the fin members 58b, 60b do not come into contact due to vibration or the like during rotation of the spindle 14.

A rear coolant passage 26a through which coolant passes is formed in the rear portion of the housing 12. The rear coolant passage 26a can be formed between the outer peripheral surface of the cylindrical member 26 and the inner peripheral surface of the housing 12 by forming a helical groove in the outer peripheral surface of the cylindrical member 26 and fitting the cylindrical member 26 so that it closely adheres to the inner surface of the housing 12. In the present embodiment, the rear coolant passage 26a is arranged so as to at least partially overlap the base member 56a of the outer fins 56, and preferably so as to overlap the entirety of base member 56a in the direction of the axis of rotation O.

A coolant, for example, water, is supplied from a coolant supply device (not illustrated) to the rear coolant passage 26*a* via a coolant supply line 32. The coolant passing through the rear coolant passage 26*a* returns to the coolant supply device via a coolant return line 34. The coolant supply device can include, for example, a tank (not illustrated) in which coolant is stored, a pump (not illustrated) for feeding coolant from the tank toward the rear coolant passage 26*a*, associated valves, and a controller or control circuit (not illustrated) for controlling the operation of the pump and the valves. The coolant supply device may include a cooling device (not illustrated) for cooling the coolant returned from the rear coolant passage 26*a*.

A middle coolant passage 28*a* through which coolant passes is formed in the central portion of the housing 12. The middle coolant passage 28*a* can be formed between the outer peripheral surface of the cylindrical member 28 and the inner peripheral surface of the housing 12, for example, by forming a helical groove in the outer peripheral surface of the cylindrical member 28 and fitting the cylindrical member 28 so as to closely adhere to the inner surface of the housing 12. In the present embodiment, the middle coolant passage 28*a* is arranged so as to at least partially overlap the stator 24, and preferably to overlap the entirety of the stator 24 in the direction of the axis of rotation O. Furthermore, the stator 24 is preferably arranged so that it directly contacts the inner peripheral surface of the cylindrical member 28 which forms the middle coolant passage 28*a*. Coolant is supplied from the coolant supply device to the middle coolant passage 28*a* via a coolant supply line 36. The coolant passing through the middle coolant passage 28*a* returns to the coolant supply device via a coolant return line 40.

A front coolant passage 30*a* through which coolant passes is formed in the front portion of the housing 12. The front coolant passage 30*a* can be formed between the outer peripheral surface of the cylindrical member 30 and the inner peripheral surface of the housing 12, for example by forming a helical groove in the outer peripheral surface of the cylindrical member 30 and fitting the cylindrical member 30 so as to closely adhere to the inner surface of the housing 12. In the present embodiment, the front coolant passage 30*a* is arranged so as to at least partially overlap the base member 60*a* of the outer fins 60, and preferably to overlap the entirety of the base member 60*a* in the direction of the axis of rotation O, and more preferably to overlap the front bearings 18, 20 and the base member 60*a*. Coolant is supplied from the coolant supply device to the front coolant passage 30*a* via a coolant supply line 42. The coolant passing through the front coolant passage 30*a* returns to the coolant supply device via a coolant return line 44.

The spindle device 10 further comprises rear heat pipes 50. The rear heat pipes 50 are incorporated in the rear portion of the spindle 14. The plurality of rear heat pipes 50 are arranged at equal intervals in the circumferential direction about the axis of rotation O of the spindle 14. The plurality of rear heat pipes 50 are preferably embedded so as to expand from the rear end of the spindle 14 toward the front end thereof at a predetermined angle θ with respect to the axis of rotation O. Specifically, the plurality of rear heat pipes 50 can be arranged within the spindle 14 along a predetermined conical surface expanding from the rear end toward the tip of the spindle 14.

Furthermore, the rear heat pipes 50 extend from positions where they overlap at least a part of the rear heat exchangers 54, 56 to positions where they overlap at least a part of the built-in motor 22, 24. More preferably, the rear heat pipes 50 extend so as to overlap the entirety of the rear heat exchanger 54, 56 and the entireties of the rear bearing 16 and the built-in motor 22, 24. In the present embodiment, the front end portions of the rear heat pipes 50 adjacent to the built-in motor 22, 24 become high temperature parts, and the rear end portions of the rear heat pipes 50 adjacent to the rear heat exchanger 54, 56 become low temperature parts.

The spindle device 10 can further comprise front heat pipes 52. The front heat pipes 52 are incorporated in the front portion of the spindle 14. The plurality of front heat pipes 52 are arranged at equal intervals in the circumferential direction about the axis of rotation O of the spindle 14. The plurality of front heat pipes 52 preferably extend parallel to the axis of rotation O and are embedded within the spindle 14. Furthermore, the front heat pipes 52 extend so as to overlap at least a part of the front heat exchanger 58, 60 and the front heat exchangers 58, 60. In the present embodiment, the end portions of the front heat pipes 52 adjacent the front bearings 18, 20 become high temperature parts, and the central portions of the front heat pipes 52 become low temperature parts.

The spindle device 10 may be further configured so that cooling air is supplied between the inner fins 54 and the outer fins 56 of the rear heat exchanger. In the present embodiment, cooling air is supplied from a cooling air source (not illustrated) between the inner fins 54 and the outer fins 56 via a cooling air supply line 46. The cooling air supplied between the inner fins 54 and the outer fins 56 passes between the inner fins 54 and the outer fins 56 and is discharged to the outside from the rear end of the spindle device 10.

Likewise, cooling air may be supplied between the inner fins 58 and the outer fins 60 of the front heat exchanger. The cooling air is supplied from the cooling air source between the inner fins 58 and the outer fins 60 of the front heat exchanger via a cooling air supply line 48. The cooling air supplied between the inner fins 58 and the outer fins 60 passes between the inner fins 58 and the outer fins 60 and is discharged to the outside from the front end of the spindle device 10.

The cooling air source can comprise, for example, a compressor (not illustrated) for compressing air, a tank or an accumulator (not illustrated) in which the compressed air is stored, and associated valves (not illustrated). Further, the cooling air source may comprise a drier (not illustrated) for drying the air from the tank or accumulator and a cooling device (not illustrated) for cooling the air from the tank or the accumulator.

The mode of operation of the present embodiment will be described below.

When the spindle 14 rotates, heat is generated from the rear bearing 16, the front bearings 18, 20, and the built-in motor 22, 24. The load acting on the rear bearing 16 is comparatively small, and thus, the amount of heat generated from the rear bearing 16 is comparatively small. The heat generated from the built-in motor, in particular, from the stator 24 thereof, is efficiently discharged to the outside of the spindle device 10 by the coolant passing through the middle coolant passage 28*a*.

Conversely, the rear heat pipes 50 embedded within the spindle 14 are heated by the heat generated from the rotor 22. In particular, in the rear heat pipes 50, the high temperature parts of the rear heat pipes 50 overlapping the rotor 22 are heated by the heat generated by the rotor 22. As a result, within the high temperature parts of each of the rear heat pipes 50, the working fluid, for example, water, evaporates. Due to the evaporation of the working fluid, the working fluid removes a quantity of heat corresponding to the heat of vaporization from circumstances, whereby the rotor 22 is cooled. The evaporated working fluid flows toward the low temperature parts of the rear heat pipes 50 toward the rear end of the spindle 14.

The rear portion of the spindle 14 between the rear bearing 16 and the rear end of the spindle 14 is cooled by the rear heat exchanger 54, 56. As a result, the low temperature parts of the rear heat pipes 50 are also cooled, and the gaseous working fluid in the low temperature parts of the rear heat pipes 50 condenses and returns to liquid form. The liquid working fluid in the low temperature parts is absorbed in the wicks in the rear heat pipes 50, and moves to the high temperature parts by capillary action. During the movement of the working fluid to the high temperature parts, the working fluid passes in the vicinity of the rear bearing 16 within the rear heat pipes 50. Though the heat generated from the rear bearing 16 is comparatively small, if the movement of the working fluid toward the high temperature parts is hindered by the heat from the rear bearing 16, a heat insulating material 62 may be arranged between the inner race of the rear bearing 16 and the rear heat pipes 50.

Furthermore, when the working fluid moves toward the high temperature parts, by arranging the rear heat pies 50 so as to expand from the rear end of the spindle 14 toward the tip thereof at a predetermined angle θ with respect to the axis of rotation O, the centrifugal force associated with the rotation of the spindle 14 acts on the liquid working fluid moving within the wicks, which promotes movement toward the high temperature parts. Thus, the heat generated from the rotor 22 is effectively transmitted to the rear portion of the spindle 14 by the rear heat pipes 50.

The heat transmitted to the rear portion of the spindle 14 by the rear heat pipes 40 and the heat transmitted to the rear portion of the spindle 14 by heat conduction from the rear bearing 16, in particular from the inner ring thereof, is transmitted by the rear heat exchanger 54, 56 to the coolant passing within the rear coolant passage 26a. Furthermore, as shown in FIG. 1, since the end part (the lower end part in FIG. 1) of the cylindrical base member 54a of the inner fins 54 contacts the inner race of the rear bearing 16, the heat from the inner race of the rear bearing 16 is directly transmitted to the base member 54a of the inner fins 54.

Since the fin members 56b of the outer fins 56 of the rear heat exchanger are arranged between the fin members 54b of the inner fins 54 so as to not contact the inner fin members 54b of the inner fins 54, heat is transmitted from the fin members 54b of the inner fins 54 to the fin members 56b of the outer fins 56 by convective heat transfer and radiant heat transfer. As a result, the inner fins 54 are cooled, whereby the rear portion of the spindle 14 is cooled.

Furthermore, cooling air is supplied from the cooling air source to the rear heat exchanger 54, 56 via the cooling air supply line 46, whereby the fin members 54b of the inner fins 54 are more effectively cooled. The cooling air supplied to the rear heat exchanger 54, 56 passes between the fin members 54b of the inner fins 54 and the fin members 56b of the outer fins 56 and is discharged from the rear end of the spindle device 10. As a result, the penetration of foreign matter such as dust into the housing 12 between the inner fins 54 and the outer fins 56 is further prevented.

Both end portions of the front heat pipes 52, which are high temperature parts, are heated by the heat generated from the front bearings 18, 20. As a result, the working fluid evaporates in the high temperature parts of the front heat pipes 52. When the working fluid evaporates, a quantity of heat corresponding to the heat of evaporation is absorbed by the working fluid in the vicinities of the high temperature parts. The evaporated working fluid moves toward the central portion, which is the low temperature parts of the front heat pipes 52, is cooled by the front heat exchanger 58, 60, condenses, and returns to liquid form. During condensation, a quantity of heat corresponding to the heat of condensation is released from the working fluid, and this heat is transmitted to the coolant passing through the front heat exchanger 58, 60 within the front coolant passage 30a. The liquid working fluid moves inside the wicks of the front heat pipes 52 toward the end portions of the front heat pipes 52, which are the high temperature parts thereof. Thus, the front bearings 18, 20 of the spindle device 10, in particular, the inner races thereof, are effectively cooled.

Furthermore, cooling air is supplied from the cooling air source to the front heat exchanger 58, 60 via the cooling air supply line 48, whereby the fin members 58b of the inner fins 58 are more effectively cooled. The cooling air supplied to the front heat exchanger 58, 60 passes between the fin members 58b of the inner fins 58 and the fin members 60b of the outer fins 60, and is discharged from the front end of the spindle device 10. As a result, the penetration of foreign matter, such as swarf generated when the machine tool machines the workpiece and machining fluid supplied to the machining area, into the housing 12 between the inner fins 58 and the outer fins 60 is further prevented.

REFERENCE SIGNS LIST

10 Spindle Device
12 Housing
14 Spindle
16 Rear Bearing
18 Front Bearing
20 Front Bearing
22 Rotor
24 Stator
26 Cylindrical Member
26a Rear Coolant Passage
28 Cylindrical Member
28a Middle Coolant Passage
30 Cylindrical Member
30a Front Coolant Passage
32 Coolant Supply Line
34 Coolant Return Line
36 Coolant Supply Line
40 Coolant Return Line
42 Coolant Supply Line
44 Coolant Return Line
46 Cooling Air Supply Line
48 Cooling Air Supply Line
50 Rear Heat Pipe
52 Front Heat Pipe
54 Inner Fin
54a Base Member
54b Fin Member
56 Outer Fin
56' Half Body Portion
56a Base Member
56b Fin Member
56c Biasing Member
58 Inner Fin
58a Base Member
58b Fin Member
60 Outer Fin
60a Base Member
60b Fin Member
62 Heat Insulating Material

The invention claimed is:

1. A spindle device for a machine tool which is formed so that a tool or workpiece is retained on a front end of a spindle which is supported so as to be rotatable relative to a housing, the spindle device comprising:
   a front bearing which rotatably supports the spindle on a front side of the spindle,
   a rear bearing which rotatably supports the spindle more rearwardly than the front bearing,
   a built-in motor which is arranged on a circumference of the spindle in a central portion between the front bearing and the rear bearing for rotatably driving the spindle,
   a heat pipe which is embedded in the spindle and which transmits heat between a central part and a rear end of the spindle,
   a plurality of plate-like inner fins which are affixed to a rear portion of the spindle protruding more rearwardly than the rear bearing, which are arranged in the direction of the axis of rotation of the spindle, and which extends in a direction orthogonal to the axis of rotation of the spindle, and
   a plurality of plate-like outer fins which are affixed to the housing and which are arranged between the plurality of inner fins so as to not contact the inner fins.

2. The spindle device according to claim 1, wherein the outer fins comprise two half body portions, each of the two half body portions has an at least partially cylindrical base member and a plurality of fin members which protrude radially from an inner peripheral surface of the base member, a biasing member is arranged between the base members of the two half body portions, and the biasing member biases the two half body portions away from each other, whereby the outer fins are pressed against the inner surface of the housing.

3. The spindle device according to claim 1, wherein an insulating material is arranged between the rear bearing and the heat pipe.

4. The spindle device according to claim 3, wherein the inner fins comprise a cylindrical base member and a plurality of fin members which protrude radially outward from an outer peripheral surface of the base member, and the inner fins are arranged so that the base member thereof contacts an inner race of the rear bearing.

5. The spindle device according to claim 1, wherein the heat pipe is arranged so as to expand from the rear end toward the front end at a predetermined angle with respect to the axis of rotation of the spindle device.

6. The spindle device according to claim 1, further comprising a coolant passage arranged so as to at least partially overlap the outer fins in the direction of rotation of the spindle.

* * * * *